United States Patent
Matwiyoff et al.

(10) Patent No.: US 11,991,983 B2
(45) Date of Patent: May 28, 2024

(54) AUTOMATIC DOG BACK SCRATCHER SYSTEM AND METHOD OF USING SAME

(71) Applicant: Cassidy Matwiyoff, San Diego, CA (US)

(72) Inventors: Cassidy Matwiyoff, San Diego, CA (US); Alexander Matthew Lopez, San Diego, CA (US); Daniel Sousa, Jr., San Diego, CA (US); Nicholas Ganson Repanich, San Diego, CA (US); David G. Alexander, San Diego, CA (US); Nicholas Chenevey, San Diego, CA (US); Marco Antonio Machuca-Romera, San Diego, CA (US); John Chen Danley, San Diego, CA (US); Luis Alberto Arevalo, San Diego, CA (US)

(73) Assignee: Cassidy Matwiyoff, Reno, NV (US)

( * ) Notice: Subject to any disclaimer, the term of this patent is extended or adjusted under 35 U.S.C. 154(b) by 400 days.

(21) Appl. No.: 17/356,291

(22) Filed: Jun. 23, 2021

(65) Prior Publication Data
US 2022/0000071 A1 Jan. 6, 2022

Related U.S. Application Data

(60) Provisional application No. 63/048,103, filed on Jul. 4, 2020.

(51) Int. Cl.
*A01K 13/00* (2006.01)
*A01K 5/02* (2006.01)
(Continued)

(52) U.S. Cl.
CPC ............ *A01K 13/00* (2013.01); *A01K 5/0233* (2013.01); *B25J 9/0003* (2013.01); *B25J 9/1679* (2013.01); *B25J 9/1697* (2013.01); *B25J 15/0009* (2013.01)

(58) Field of Classification Search
CPC ........ A01K 13/00; A01K 13/004; A01K 5/02; A01K 5/0225; A01K 5/0233; A01K 15/00;
(Continued)

(56) References Cited

U.S. PATENT DOCUMENTS 4,872,422 A * 10/1989 Della Vecchia ..... A01K 13/004
119/621
5,200,679 A * 4/1993 Graham ............... B25J 15/0009
901/33
(Continued)

FOREIGN PATENT DOCUMENTS

| CN | 106818524 A | * | 6/2017 | ............... A01K 5/02 |
| KR | 20180089720 A | * | 8/2018 | ............ A01K 13/00 |
| KR | 20210064014 A | * | 6/2021 | |

OTHER PUBLICATIONS

Machine translation of KR-20180089720-A to Song. (Year: 2018).*
(Continued)

*Primary Examiner* — Magdalena Topolski
*Assistant Examiner* — Marisa V Conlon
(74) *Attorney, Agent, or Firm* — Procopio, Cory, Hargreaves & Savitch LLP

(57) ABSTRACT

An automatic dog back scratcher system that scratches a dog, comprising a frame assembly; a housing covering the frame assembly; a movable arm assembly supported by the frame assembly and including a movable finger assembly; a
(Continued)

treat dispenser assembly; a camera; a motion sensor; a controller configured to sense motion of an object via the motion sensor, determine the object in motion is a dog via the camera, dispense a treat via the treat dispenser assembly to attract the dog to a location adjacent to the automatic dog back scratcher system, and operate the movable arm assembly to move the arm adjacent to the dog and scratch the dog with the movable finger assembly.

2 Claims, 6 Drawing Sheets

(51) Int. Cl.
  *B25J 9/00* (2006.01)
  *B25J 9/16* (2006.01)
  *B25J 15/00* (2006.01)
(58) Field of Classification Search
  CPC .... A01K 15/02; A01K 15/023; A01K 15/024; B25J 9/0003; B25J 9/1679; B25J 9/1697; B25J 15/0009; B25J 9/003; B25J 9/006
  USPC ........ 119/600, 601, 608, 609, 621, 702, 707
  See application file for complete search history.

(56) References Cited

U.S. PATENT DOCUMENTS

| | | | | |
|---|---|---|---|---|
| 6,485,442 | B2* | 11/2002 | Batula | A47D 15/00 5/915 |
| 8,088,086 | B1* | 1/2012 | Schmuck | A61H 23/0254 601/84 |
| 8,924,020 | B2* | 12/2014 | Kim | B25J 9/16 901/46 |
| 9,125,378 | B1* | 9/2015 | Frost | A01K 13/004 |
| 9,764,476 | B1* | 9/2017 | Green | B25J 11/008 |
| 2006/0207518 | A1* | 9/2006 | Steffen | A01K 15/025 119/702 |
| 2014/0251230 | A1* | 9/2014 | Go | A01K 15/024 119/706 |
| 2015/0100037 | A1* | 4/2015 | Allsup | A01K 13/002 119/51.01 |
| 2017/0112095 | A1* | 4/2017 | Frost | B25J 9/1694 |

OTHER PUBLICATIONS

Machine translation of KR-20180089720-A to Hefei Totem Dragon Medical Supplies Dev Co Ltd. (Year: 2017).*
Merged English translation of Yoo (Year: 2021).*

* cited by examiner

AUTOMATIC DOG BACK SCRATCHER SYSTEM AND METHOD OF USING SAME

CROSS REFERENCE TO RELATED APPLICATION

This application claims the benefit of U.S. Provisional Patent Application No. 63/048,103, filed Jul. 4, 2020, under 25 U.S.C. 119. U.S. Provisional Patent Application No. 63/048,103 is incorporated by reference.

FIELD OF THE INVENTION

The present invention relates to automatic dog back scratcher systems.

BACKGROUND OF THE INVENTION

Dog owners frequently must leave their dogs at home while they go to work. This can be difficult for dogs, especially dogs with anxiety disorders, as they are left untouched and without human interaction for large blocks of time. Dogs desire most to be loved and scratched.

SUMMARY OF THE INVENTION

An aspect of the invention involves an automatic dog back scratcher system and method that fosters human-like interaction with dogs while their owners are away. The automatic dog back scratcher system includes a scratching hand, allows for adjustable height, mobile access, and treat dispensing.

Another aspect of the invention involves an automatic dog back scratcher system that scratches a dog, comprising a frame assembly; a housing covering the frame assembly; a movable arm assembly supported by the frame assembly and including a movable finger assembly; a treat dispenser assembly; a camera; a motion sensor; a controller configured to sense motion of an object via the motion sensor, determine the object in motion is a dog via the camera, dispense a treat via the treat dispenser assembly to attract the dog to a location adjacent to the automatic dog back scratcher system, and operate the movable arm assembly to move the arm adjacent to the dog and scratch the dog with the movable finger assembly.

One more implementations of the aspect of the invention described immediately above includes one or more of the following: the movable arm assembly includes an upper arm member, a lower arm member, and a hand assembly that includes the movable finger assembly, a shoulder joint with an associated motor that moves the upper arm member relative to the frame assembly, an elbow joint with an associated motor that moves the lower arm member relative to the upper arm member, and a motor associated with the movable finger assembly to impart motion to the movable finger assembly to scratch the dog; the lower arm member includes the motor associated with the movable finger assembly, and further includes one or more lines coupling the movable finger assembly to the motor whereby rotation of the motion in one direction moves the movable finger assembly upward and motion in an opposition direction moves the movable finger assembly downward; and/or the treat dispenser assembly includes a treat dispensing tube configured to receive dog treats, a plate with a treat dispensing hole that the dog treats fall through, and a motor associated therewith that the controller causes the treat dispensing tube to move with the dog treats therein relative to the treat dispensing hole to causes treats to slide along the plate and fall through the treat dispensing hole for dispensing to the dog.

An additional aspect of the invention involves method of using an automatic dog back scratcher system that scratches a dog, comprising a frame assembly; a housing covering the frame assembly; a movable arm assembly supported by the frame assembly and including a movable finger assembly; a treat dispenser assembly; a camera; a motion sensor; a controller configured to sense motion of an object via the motion sensor, determine the object in motion is a dog via the camera, dispense a treat via the treat dispenser assembly to attract the dog to a location adjacent to the automatic dog back scratcher system, and operate the movable arm assembly to move the arm adjacent to the dog and scratch the dog with the movable finger assembly, the method comprising detecting motion of an object via the motion sensor and the controller; determining the object in motion is a dog via the camera and the controller; operating the movable arm assembly to move the arm adjacent to the dog and scratch the dog with the movable finger assembly.

One more implementations of the aspect of the invention described immediately above includes one or more of the following: the further comprises receiving a dog treat in the treat dispenser assembly; and dispensing the dog treat via the treat dispenser assembly to attract the dog to a location adjacent to the automatic dog back scratcher system to condition the dog to position itself adjacent to the automatic dog back scratcher system when the dog desires petting; the movable arm assembly includes an upper arm member, a lower arm member, and a hand assembly that includes the movable finger assembly, a shoulder joint with an associated motor that moves the upper arm member relative to the frame assembly, an elbow joint with an associated motor that moves the lower arm member relative to the upper arm member, and a motor associated with the movable finger assembly to impart motion to the movable finger assembly to scratch the dog; the lower arm member includes the motor associated with the movable finger assembly, and further includes one or more lines coupling the movable finger assembly to the motor whereby rotation of the motion in one direction moves the movable finger assembly upward and motion in an opposition direction moves the movable finger assembly downward; and/or the treat dispenser assembly includes a treat dispensing tube configured to receive dog treats, a plate with a treat dispensing hole that the dog treats fall through, and a motor associated therewith that the controller causes the treat dispensing tube to move with the dog treats therein relative to the treat dispensing hole to causes treats to slide along the plate and fall through the treat dispensing hole for dispensing to the dog.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

Figure 1:
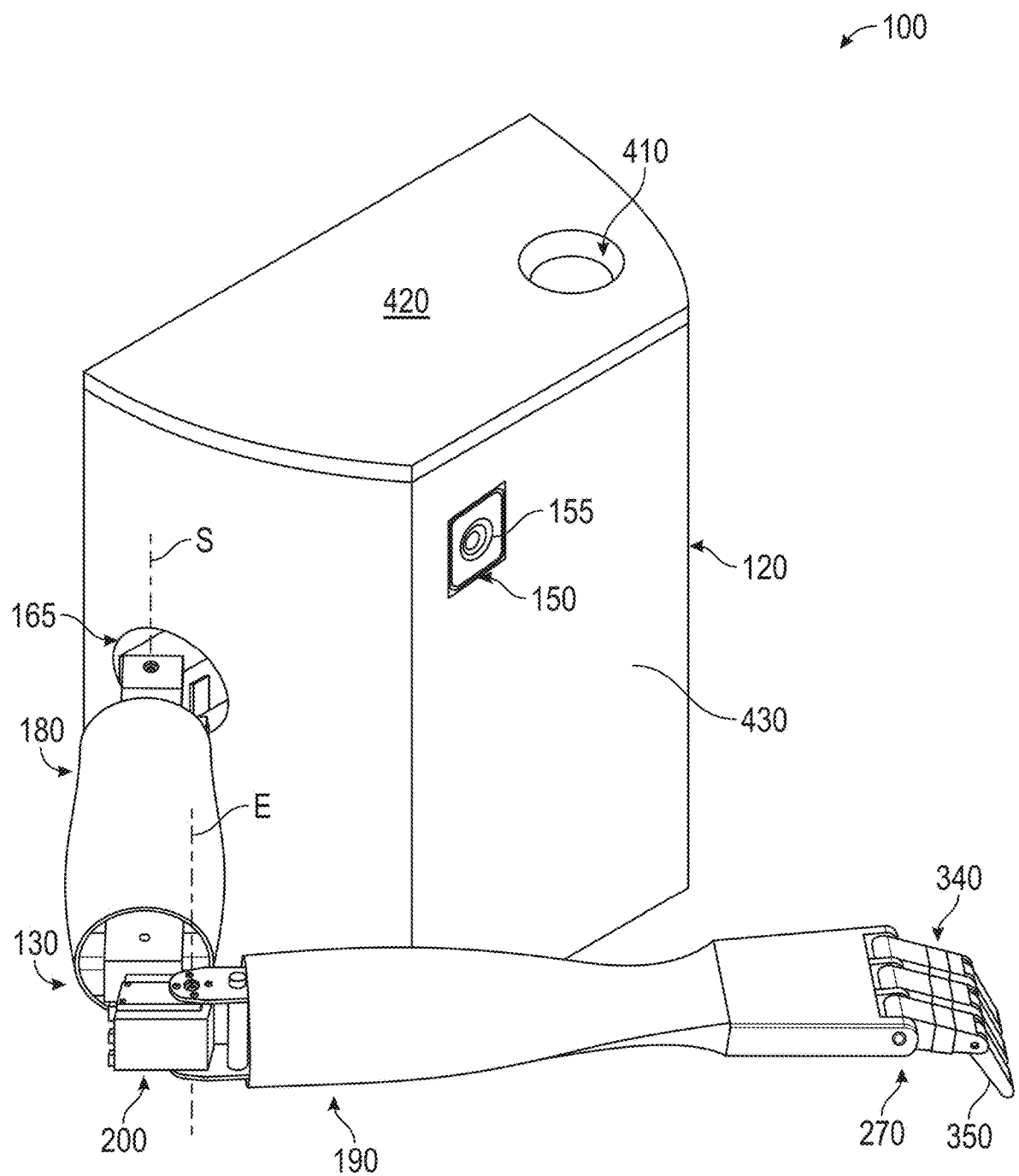
FIG. 1 is a front perspective view of an embodiment of an automatic dog back scratcher system.

With reference to FIGS. 1-4, an embodiment of an automatic dog back scratcher system ("system") 100 and method of use will be described.

The system 100 includes a frame assembly 110, a housing 120 covering the frame assembly 110, a movable arm assembly 130, a treat dispenser assembly 140, a camera 150, and a motion sensor 155.

Figure 4:
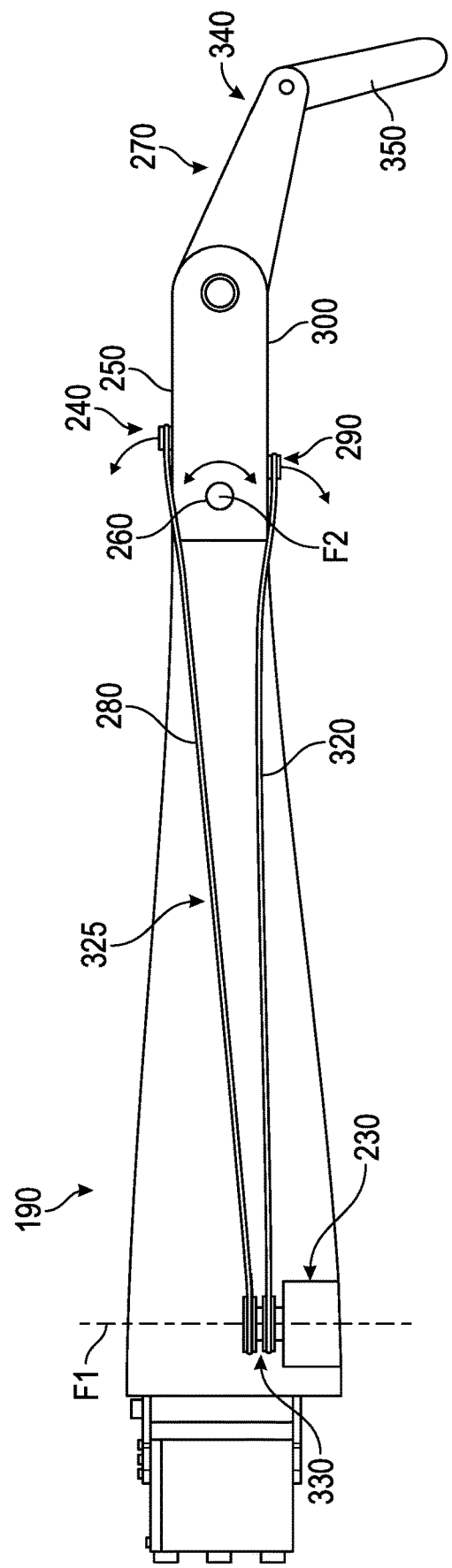
FIG. 4 is a cross-sectional side view of an embodiment of an arm of the automatic dog back scratcher system of FIG. 1.
Figure 5:
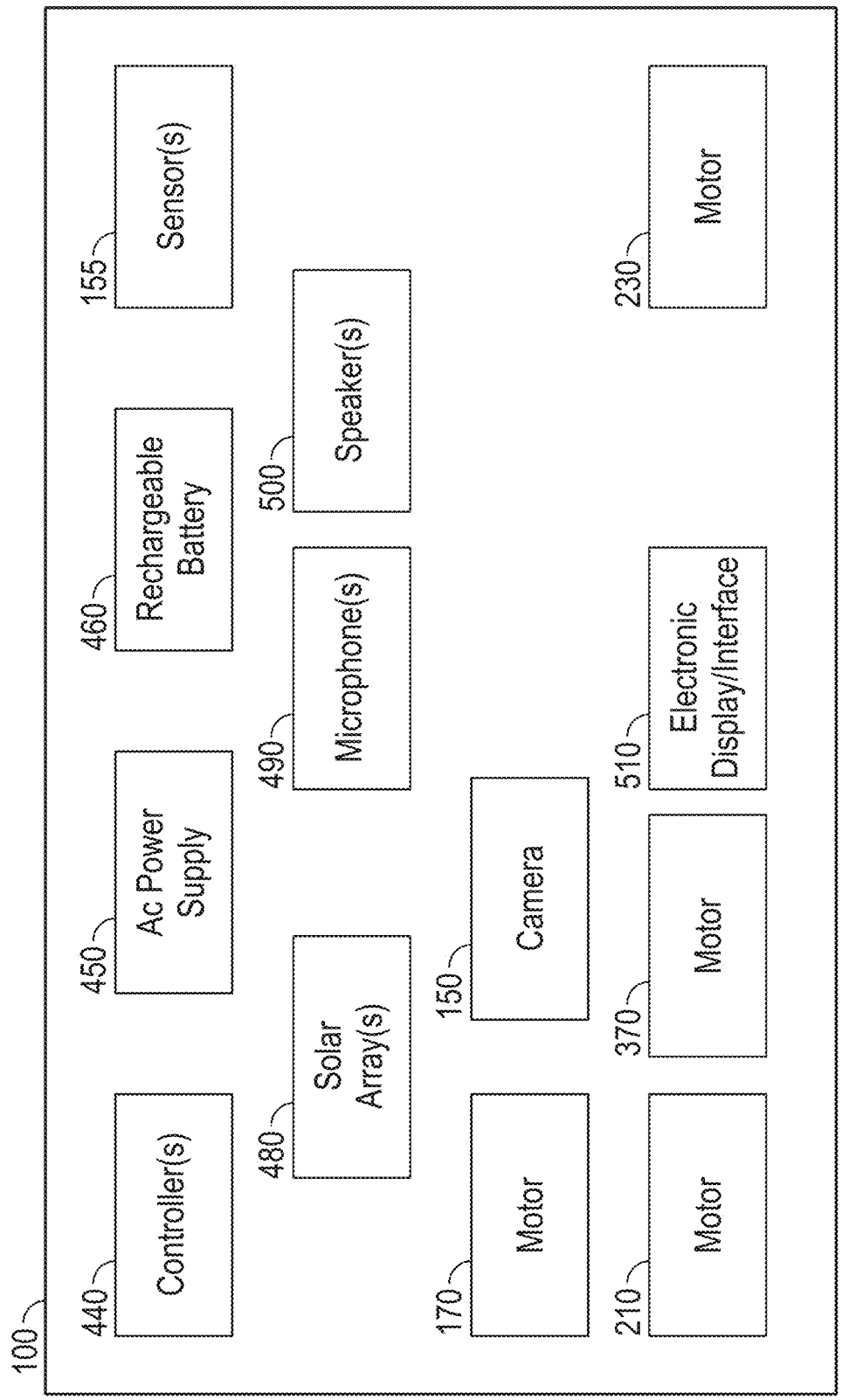
FIG. 5 is a block diagram illustrating electronic components of the automatic dog back scratcher system of FIG. 1.

The movable arm assembly 130 is coupled to the frame assembly 110 via lateral frame member 160 at shoulder joint 165. The shoulder joint 165 includes a motor 170 to impart rotational movement of upper arm/first arm/bicep member 180 about vertical axis S relative to lateral frame member 140. A lower arm/second arm/forearm member 190 is operably coupled to the upper arm 180 via elbow joint 200. The elbow joint 200 includes a motor 210 to impart rotational movement of the lower arm 190 relative to the upper arm 180 about vertical axis E. As shown in FIG. 4, the lower arm 190 includes a motor 230 that is coupled to upper attachment member 240 on an upper part 250 (above rotation finger joint 260) of hand 270 via an upper wire/tendon/line 280 and is coupled to lower attachment member 290 on a lower part 300 (below rotation finger joint 260) via a lower wire/tendon/line 320 of hand 270. The tendons 280, 320 form a tendon system 325 that moves the finger assembly 340 in a scratching motion. Rotation of motor shaft 330 about vertical axis F1 in a clockwise direction causes one of the wires/tendons 280, 320 to pull more on the upper part 250 or the lower part 300, causing finger assembly 340 to move in unison either upper or down about horizontal axis F2. Fingers 350 of the finger assembly 340 are fixed relative to each other and move up and down in unison. The motors 170, 210, 230 may be stepper motors, servo motors, or other types of motors.

Figure 2:
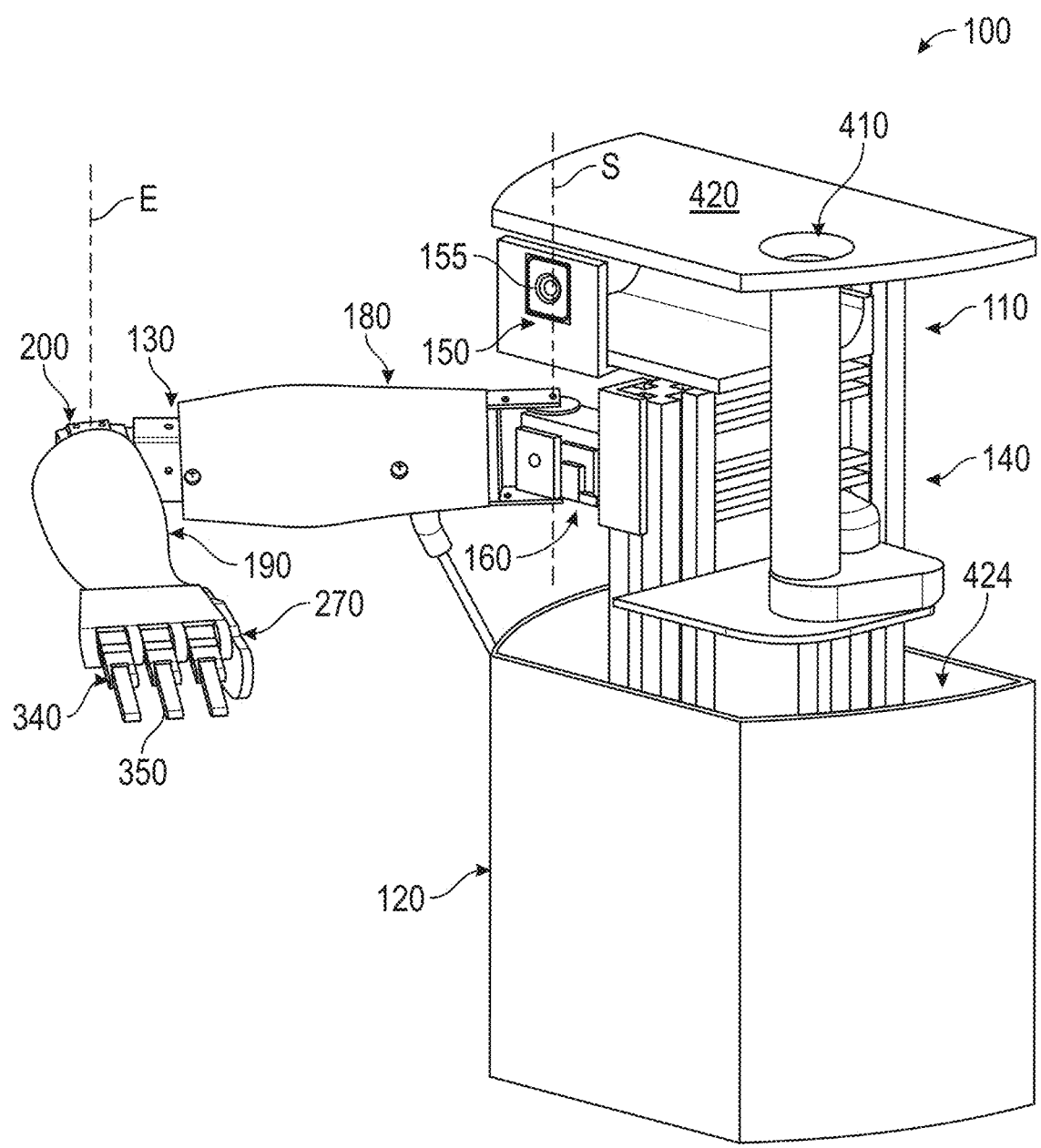
FIG. 2 is another front perspective view of the automatic dog back scratcher system of FIG. 1, and shows portions of an outer housing removed.
Figure 3:
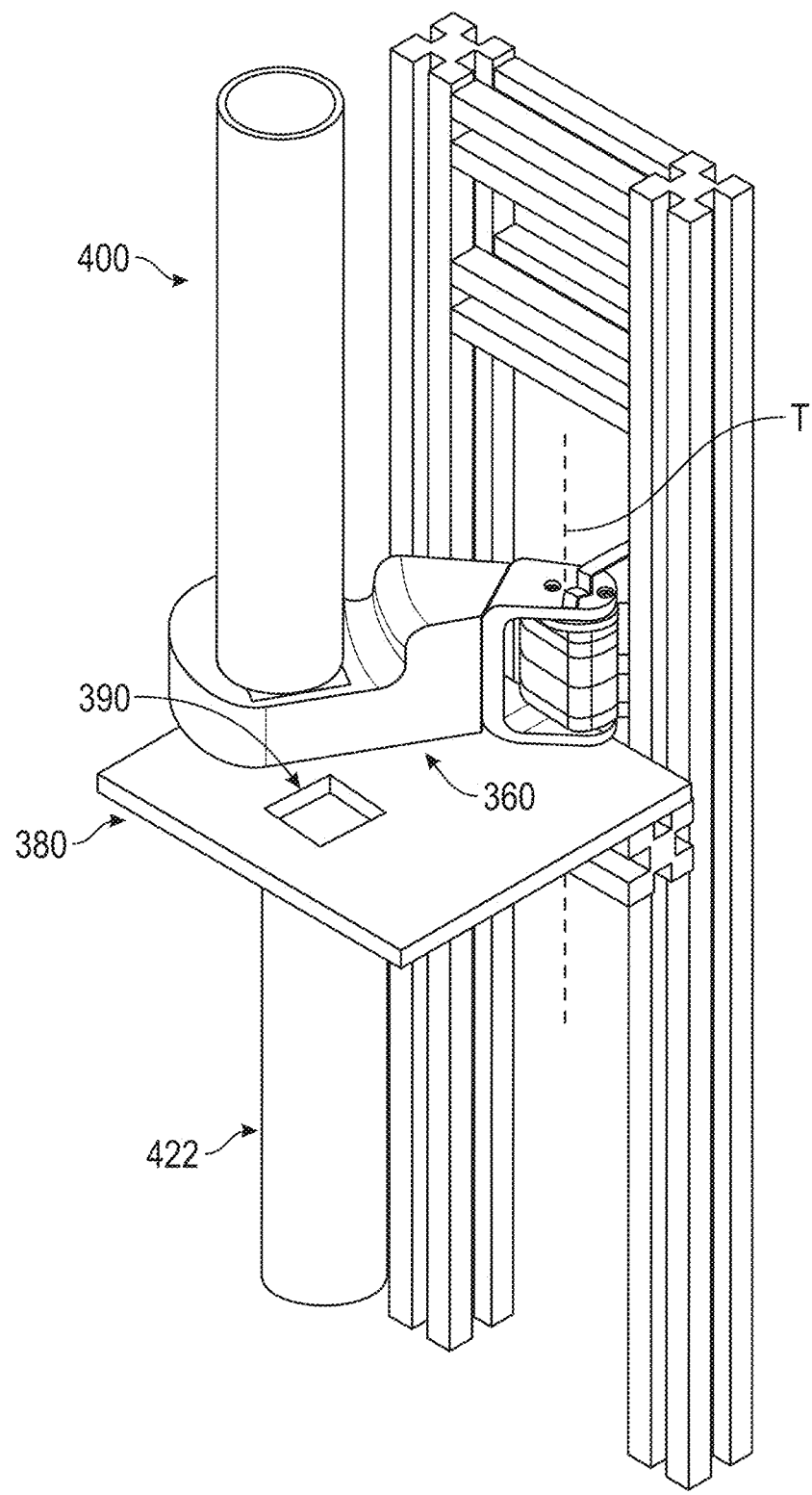
FIG. 3 is a perspective view of an embodiment of a treat dispenser of the automatic dog back scratcher system of FIG. 1.

With reference to FIGS. 2 and 3, the treat dispenser assembly 140 includes a bracket 360 pivotally coupled to the frame assembly 110. A motor 370 imparts rotational movement of the bracket 360 relative to the frame assembly 110 about a vertical axis T above a plate 380. The plate 380 includes a treat dispensing hole 390. A vertically oriented treat dispensing tube 400 is carried by the movable bracket 360. One or more treats may be deposited into the treat dispenser assembly 140 (e.g., capacity of 15 treats) via treat deposit hole 410 on a top 420 of the housing 120. The one or more treats fall into the tube 400 and down onto the plate 380. When it is determined a treat should be dispensed to the dog, the motor 370 imparts rotational movement of the bracket 360 and moves a treat on the plate 380 and within the confines of the tube 400/bracket 360 over the treat dispensing hole 390 so that the treat drops and is dispensed to the dog (e.g. through lower tube 422/chute 424). The location of the dispensed treat may be used to put the dog in a predetermined position and/or proximity optimal for operating the movable arm assembly 130 to pet the dog with the finger assembly 340. Treats dispensed by the treat dispenser assembly 140 incentivizess the dog to approach and activate the system 100, and trains the dog to utilize the system 100 without requiring the treat incentive.

The camera 150 and motion sensor 155 are carried by the frame assembly 110 and are disposed in a front 430 of the housing 120. The camera 150 may be used, for example, but not limited to, sensing the present of the dog in a predetermined position relative to the system 100 to operate the movable arm assembly 130 to pet the dog with the finger assembly 340.

The system 100 may include one or more additional features such as, but not limited to, one or more controllers/CPUs 440, an AC power supply 450, one or more rechargeable batteries 460, one or more sensors (e.g. motion sensor(s) and/or other sensor(s)) 155, one or more solar arrays 480 (e.g., to power the system 100 for a dog in an outdoor environment), a microphone 490, a speaker 500, an electronic display/interface 510. The controller 440 may allow an owner to remotely interact (e.g., via a mobile app on one's smart phone) with one's dog. For example, the owner speaks to the dog via the speaker 500, listens to dog via the microphone 490, and/or sees the dog with the camera 150. In an alternative embodiment, a grooming glove (or a variety of different types of grooming gloves) go over the finger assembly 340 and are used to prevent pinch points and/or provide a textured (or different types of textured surfaces) that interact with the dog during scratching operation.

The system 100 preferably includes a wall mount to secure the system 100 to the wall. In an alternative embodiment, the system 100 is free-standing and includes a wide heavy base to prevent the dog from tipping it over. The system 100 is powered by plugging the AC power supply 450 into an AC wall outlet. The system 100 may adjustable in height (or mountable at different heights) relative to the ground so that the movable arm assembly 130 and the finger assembly 340 are at an optimal height for the particular height of the dog (e.g., average height range for small dogs is about 5-15 inches, average height range for larger dogs is 16-26 inches).

In use, a dog may be conditioned to use the automatic dog back scratcher system 100. Treats are received in the treat dispenser assembly 140. When the motion sensor 155 detects the motion of an object, using machine learning based dog recognition software, the camera and the controller identifies if the dog is approaching the system 100. Once the dog is recognized, the controller 440 causes the treat dispenser assembly 140 to dispense a treat in the manner described above at a predetermined location to attract and optimally position/locate the dog to be automatically scratched by the finger assembly 340 of the movable arm assembly 130 (e.g., within 6 inches of where the treat is dispensed). Once the dog has obtained the treat and the dog is in predetermined proximity and/or at a predetermined location relative to the system 100, which the controller 440 determines via the camera 150, the motion sensor 155, and machine learning based dog recognition software, the movable arm assembly 130 is moved into optimal position, if needed, by the controller 440 and the finger assembly 340 is actuated in the manner described above to automatically scratch the dog.

Once the dog is conditioned to use the automatic dog back scratcher system 100, the dog is automatically scratched in the manner described above, but without the need to dispense a treat.

Figure 6:
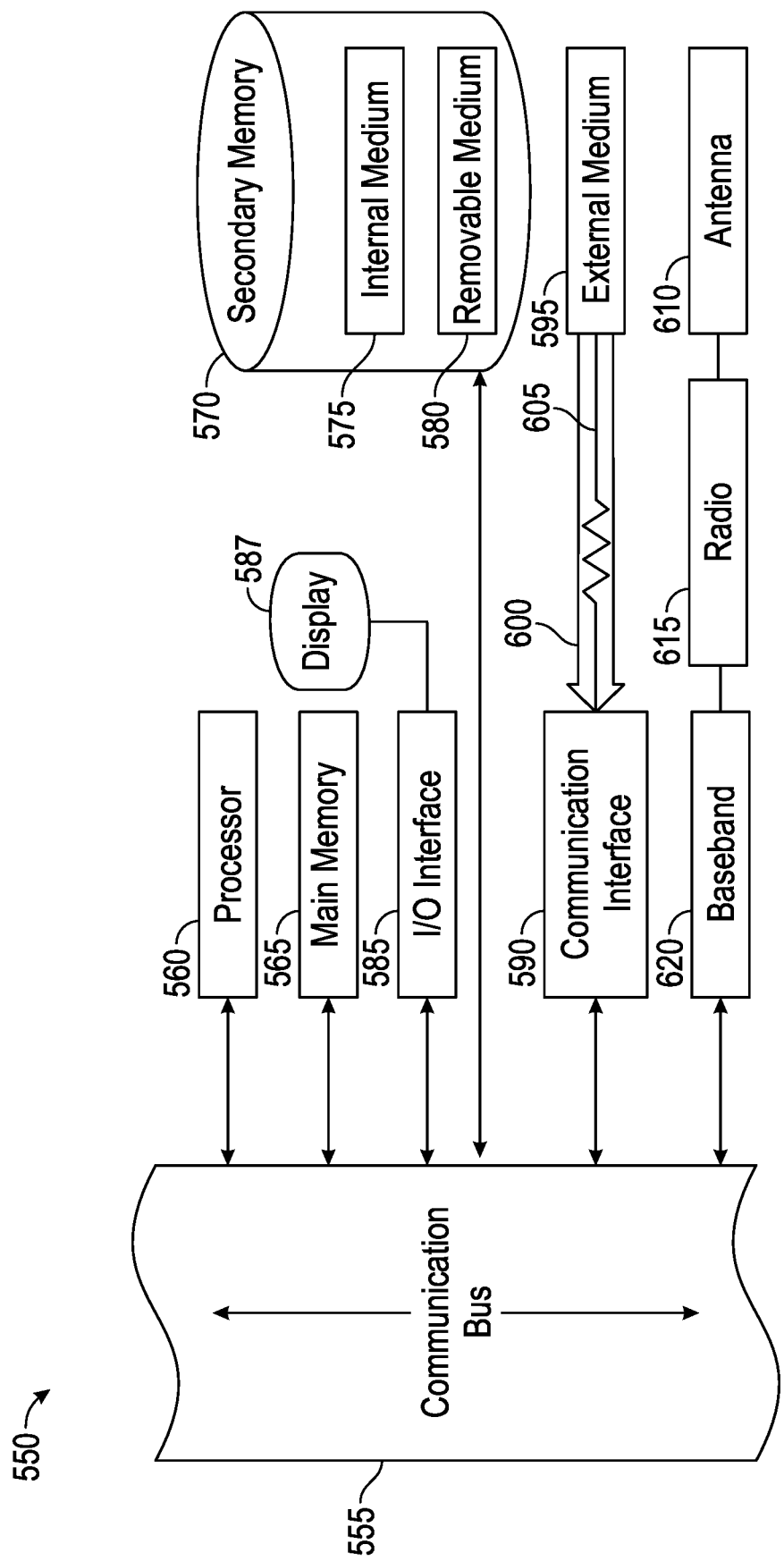
FIG. 6 is a block diagram illustrating an example wired or wireless processor enabled device that may be used in connection with various embodiments described herein.

FIG. 6 is a block diagram illustrating an example wired or wireless system 550 that may be used in connection with various embodiments described herein. For example the system 550 may be used as or in conjunction with the computer-controlled system and computer control shown and/or described herein with respect to the automatic dog back scratcher system 100. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display 587. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. An automatic dog back scratcher system that scratches a dog, comprising:
    a frame assembly;
    a movable arm assembly supported by the frame assembly and including a movable finger assembly;
    a treat dispenser assembly, comprising a treat dispensing tube configured to receive dog treats, a plate with a treat dispensing hole that the dog treats fall through, and a motor associated therewith that the controller causes the treat dispensing tube to move with the dog treats therein relative to the treat dispensing hole to cause treats to slide along the plate and fall through the treat dispensing hole for dispensing to the dog;
    a camera;
    a motion sensor;
    a housing covering the frame assembly and treat dispenser, wherein the movable arm assembly extends outward from the housing, wherein the housing is mountable on a wall to elevate the automatic dog back scratcher system above the ground;
    a controller configured to sense motion of an object via the motion sensor, determine the object in motion is a dog via the camera, based on determining the object in motion is a dog, dispense a treat via the treat dispenser assembly to attract the dog to a location adjacent to the automatic dog back scratcher system, and then operate the movable arm assembly to move the movable arm assembly adjacent to the dog and scratch the dog with the movable finger assembly;
    wherein when the treat dispenser dispenses the treat to the dog, the treat falls to a location on the ground that is adjacent and beneath the movable finger assembly, such that when the dog approaches the treat, the movable finger assembly is above and adjacent to the dog's back;
    wherein the movable arm assembly includes an upper arm member, a lower arm member, and a hand assembly that includes the movable finger assembly, the lower arm member including a first end that is coupled to the hand assembly and a second end opposite to the first end, a shoulder joint with a shoulder joint motor that moves the upper arm member relative to the frame assembly, an elbow joint with an elbow joint motor that moves the lower arm member relative to the upper arm member, and a lower arm member motor disposed adjacent to the second end of the lower arm member, the lower arm member motor associated with the movable finger assembly to impart motion to the movable finger assembly to scratch the dog, the hand assembly includes a rotation finger joint, an upper part including an upper attachment member above the rotation finger joint, a lower part including a lower attachment member below the rotation finger joint, the lower arm member includes an upper tendon coupling the lower arm motor to the upper part of the hand assembly, a lower tendon coupling the lower arm motor to the lower part of the hand assembly, whereby rotation of the lower arm motor in one direction causes the upper tendon to pull more on the upper part of the hand assembly than the lower tendon pulls on the lower part of the hand assembly, causing the finger assembly to move upward, and rotation of the lower arm motor in an opposite direction causes the lower tendon to pull more on the lower part of the hand assembly than the upper tendon pulls on the upper part of the hand assembly, causing the finger assembly to move downward.

2. A method of using an automatic dog back scratcher system, comprising:
    providing the automatic dog back scratcher system of claim 1;
    receiving a dog treat in the treat dispensing tube of the treat dispenser assembly;
    detecting motion of an object via the motion sensor and the controller;
    determining the object in motion is a dog via the camera and the controller; and based on said determining:
- causing, with the controller, the treat dispensing tube to move relative to the treat dispensing hole to cause the dog treat to slide along the plate and fall through the treat dispensing hole for dispensing the dog treat to the dog, wherein the treat falls to the location on the ground that is adjacent and beneath the movable finger assembly, such that when the dog approaches the treat, the movable finger assembly is above and adjacent to the dog's back; and
- operating the movable arm assembly to move the movable arm assembly adjacent to the dog, and then operating the lower arm member and the hand assembly to scratch the dog with the movable finger assembly by:
  - rotating the lower arm motor in one direction, causing the upper tendon to pull more on the upper part of the hand assembly than the lower tendon pulls on the lower part of the hand assembly, causing the finger assembly to move upward, and
  - rotating the lower arm motor in an opposite direction, causing the lower tendon to pull more on the lower part of the hand assembly than the upper tendon pulls on the upper part of the hand assembly, causing the finger assembly to move downward.

\* \* \* \* \*